3,072,696
PROCESS FOR PURIFYING TETRAETHYL LEAD

Gregory D. Hedden, Madison, Wis., and Bernard A. Rausch, Newark, N.J., assignors to E. I. du Pont de Nemours and Company, Wilmington, Del., a corporation of Delaware
No Drawing. Filed Apr. 11, 1961, Ser. No. 102,108
14 Claims. (Cl. 260—437)

This invention relates to a process for purifying tetraethyl lead and particularly for reducing the hexaethyl dilead content thereof.

Tetraethyl lead is manufactured commercially by alkylating a lead-sodium alloy with ethyl chloride. By-products are also normally formed, including high-boiling organoleads, by incomplete ethylation and side reactions. A significant and objectionable by-product is hexaethyl dilead. According to Gittins and Mattison in U.S. Patent 2,763,673, tetraethyl lead for gasoline use should contain less than 0.3% of this impurity, but that sometimes it is produced containing much more, even up to 15% depending on process conditions.

When the hexaethyl dilead content is too high, or it is desired to convert it to tetraethyl lead, the prior art suggests treatment with alkyl iodides (Krohn and Shapiro, U.S. Patent 2,555,891), with heat alone or silicaceous catalysts (McDyer and Closson, U.S. Patent 2,571,987), with carbon catalysts (Gittins and Mattison, U.S. Patent 2,763,673), or with oxidizing agents. These methods tend to be either inefficient or insufficiently selective in destroying alkyl-lead compounds.

It is an object of this invention to provide a new and efficient process for decreasing the hexaethyl dilead content of tetraethyl lead containing it. A further object is to provide such a process which destroys hexaethyl dilead with high selectivity in the presence of major amounts of tetraethyl lead. A further object is to provide such a process which is easy to operate by simply washing the impure tetraethyl lead in the liquid phase with an aqueous reagent which is immiscible with the tetraethyl lead whereby on settling there results a purified tetraethyl lead layer and a readily separable and easily disposable wash layer. Other objects are to advance the art. Still other objects will appear hereinafter.

The above and other objects may be accomplished in accord with this invention which comprises the process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from 0° C. to about 70° C. in the presence of an oxygen-containing gas with an aqueous solution of from about 1% to about 50% by weight of an acid of the group consisting of formic acid and acetic acid, employing an amount of said aqueous solution to provide a separate aqueous phase and from 0.1 to about 100 parts by weight of acid for each part of hexaethyl dilead, then settling the reaction mixture to form an aqueous layer and a layer of purified tetraethyl lead, and separating said layers.

By this process, tetraethyl lead may be obtained substantially free of hexaethyl dilead. The quantities of materials, the temperature, time and intimacy of contact are easily co-ordinated to reduce the hexaethyl dilead content to an acceptable level, for example at least to below 0.3% (as suggested by Gittins and Mattison) and preferably to below 0.1%. The tetraethyl lead undergoing purification may be subjected to one or more additional treatments, as desired, to achieve the desired result. Tetraethyl lead losses are normally low, i.e. less than 0.5%.

Besides reducing the hexaethyl dilead level, the acid treatment by the process of the invention also effects a general overall improvement in the appearance and quality of the product. For example, crude tetraethyl lead, that is yellow and hazy with naturally forming contaminants, is made clear and water-white. The improved quality is reflected also in standard oxidation stability tests on fuel compositions consisting essentially of gasoline and an antiknock blend of the tetraethyl lead. The fuel compositions containing the treated tetraethyl lead show significantly longer induction periods.

The effect of decreasing the hexaethyl dilead content of tetraethyl lead by the process of this invention without destroying objectionably large amounts of tetraethyl lead appears to be specific to the acid solutions of this invention. Other carboxylic acids, e.g. citric acid, and oxalic acid, are significantly less effective to remove the hexaethyl dilead and are more expensive. Sulfuric acid also is much less effective. Hydrochloric acid gives erratic and unsatisfactory results, and it and ferric chloride tend to destroy objectionably large amounts of the tetraethyl lead. Furthermore, the inorganic acids and ferric chloride solutions are highly corrosive. Also, the use of ferric chloride solutions results in the formation of rather large amounts of solids which are difficult to remove from the tetraethyl lead.

The tetraethyl lead which is to be treated by the process of this invention will contain from about 0.2% to about 15% by weight of hexaethyl dilead and will be substantially free of sludge-forming organic bismuth compounds. Such tetraethyl lead will be the art-recognized, steam-distilled, and aerated product. By "substantially free of sludge-forming organic bismuth compounds" is meant that the tetraethyl lead, on being further aerated by passing air through the charge in the presence of water, forms less than 0.002 gram of sludge per 100 ml. of tetraethyl lead.

While the sludge-forming bismuth impurities are ordinarily removed by aerating as described for example by Bertolette and Parmelee in U.S. Patent 2,400,383, other variations involving oxidizing conditions may also be employed as described by Parmelee in U.S. Patents 2,410,-356, 2,440,810, and 2,426,789. Such treatments, while effective to remove the organic bismuth compounds, are not practical to lower the hexaethyl dilead content to non-objectionable levels (when such impurity also occurs). It may be noted that the commercial ethylation process for the manufacture of tetraethyl lead referred to by Bertolette and Parmelee in the above patents, while normally producing organo bismuth compounds along with tetraethyl lead (as a result of bismuth metal contaminating the commercial lead used in such process), did not normally result in the presence also of objectionable proportions of hexaethyl dilead, for the reasons (mainly of prior thermal history of the product) discussed by Gittins and Mattison in U.S. Patent 2,763,673.

The aqueous solutions of formic acid or acetic acid, which are employed in the process of this invention, will contain such acid in a concentration of from about 1% to about 50% by weight, and usually from about 1% to about 15% by weight. Formic acid is significantly more effective than acetic acid and in lower concentrations and smaller amounts. Preferred concentrations of formic acid will be from about 1% to about 10% by weight, and those for acetic acid will be from about 5% to about 15% be weight.

The aqueous solutions of the acids will be employed in an amount by volume to provide a separate aqueous phase with the tetraethyl lead. Conveniently, the amount of the aqueous acid solution will be from about 0.2 to about 100 volume percent based on the tetraethyl lead, usually from about 2 to about 16 volume percent, and most preferably about 10 volume percent. Much larger volumes of acid solution may be used, but are unnecessary and uneconomical.

The aqueous acid solution should provide from 0.1 to about 100 parts by weight of acid (formic acid or acetic acid) for each part of hexaethyl dilead present in the tetraethyl lead to be treated, and usually will be sufficient to provide from about 0.5 to about 5 parts by weight of acid for each part of hexaethyl dilead. When formic acid is employed, there preferably will be provided from about 0.5 to about 2 parts by weight thereof per part of hexaethyl dilead and, for acetic acid, the preferred amount will be from about 1 to about 5 parts by weight. Thus, when it is desired to use a particular volume percent of aqueous acid solution, the concentration of the acid therein will be adjusted within the limits above set forth to provide the desired amount of acid per part of hexaethyl dilead. In general, the more concentrated acid solutions and the larger amounts of acid will be used to treat tetraethyl lead having the higher concentrations of hexaethyl dilead. Since it is generally preferred, for convenient handling and control of the system, to use about 10 volume percent of acid solution and since the hexaethyl dilead content of the tetraethyl lead is normally fairly low (i.e. about 0.3 to about 1%), the treating solution normally will be dilute acid. For example, 100 volumes of tetraethyl lead containing 1% hexaethyl dilead can be treated with 10 volumes of 7% formic acid and, if the hexaethyl dilead content is 0.3%, the formic acid concentration can be reduced to about 2% by weight of the aqueous phase. As a further example, in treating tetraethyl lead containing 0.4% hexaethyl dilead with 10% acetic acid, there usually will be used sufficient solution to provide 0.5 part of acetic acid per 100 parts of tetraethyl lead (i.e. 0.5 part acetic acid for 0.4 part hexaethyl dilead, a ratio of 1.25 to 1).

The mixing of the tetraethyl lead and the aqueous acid phase is also conducted in the presence of an oxygen-containing gas, for example by vigorously agitating the reactants under an atmosphere of oxygen or air, or preferably by sparging such gas into and through the mixture under agitation. Air is preferred. Such use of oxygen further contributes to the effectiveness of the acid to lower the hexaethyl dilead content of the impure tetraethyl lead. In comparison, simply aerating the steam-distilled product in the presence of water (no acetic acid or formic acid present) is ineffective to eliminate hexaethyl dilead. Also, treating the tetraethyl lead with aqueous acid alone, in the absence of added air, is significantly less effective than the combined treatment. Best results are obtained by passing a stream of air through the mixture of tetraethyl lead and aqueous acid under vigorous agitation. Preferably, the air is sparged through the mixture in amounts of from about 3 to about 60 standard cubic feet per hour per square foot of cross-sectional area of the treating vessel, most preferably from about 15 to about 45 s.c.f./hr./ft.$^2$.

The process of this invention may be caried out at temperatures in the range of 0° C. to about 70° C. Usually, it will be carried out in the range of from about 20° C. to about 50° C., and preferably from about 40° C. to about 50° C. It is also preferred, when operating at the higher temperatures, to employ the more dilute acid solutions to minimize the possibility of objectionably large losses of tetraethyl lead, as by decomposition due to the combined effect of the higher temperatures and the more concentrated acid solutions.

The time of contact may vary widely, from a minute or less to an hour or two or more, depending on the extent of purification desired, the concentration and the amount of acid employed, and the effectiveness of the mixing means to provide intimate contact of the reactants. It should be understood that formic acid and acetic acid can also destroy tetraethyl lead, given the right conditions of concentration, temperature, and time of contact, so that the contact should not be unduly prolonged beyond that needed to lower the hexaethyl dilead content to the desired level.

The process is simple and easy to operate. The tetraethyl lead and the aqueous acid solution are mixed so as to obtain intimate contact of the acid with the hexaethyl dilead present in the tetraethyl lead. For efficient operation, god contact should be established between the aqueous acid-air-tetraethyl lead phases, as by vigorous agitation. There may also be used to advantage the types of mixing known to the art of mixing materials of considerably different densities, such as turbulent flow, passing the materials through the center of a centrifugal pump, circulating the materials externally between the bottom and the top of the mixing tank, and the like.

After the aqueous acid solution has been mixed with the tetraethyl lead for the desired time, the mixture is settled whereby it forms an upper aqueous layer and a lower layer of purified tetraethyl lead, that is, tetraethyl lead in which the hexaethyl dilead content has been significantly decreased. Such layers are separated, as by drawing off the lower tetraethyl lead layer or decanting off the upper aqueous layer.

The tetraethyl lead layer, resulting from the aqueous acid treatment, normally will be hazy, and precipitated material will be observed at the interface of the phases. The tetraethyl lead layer also normally contains small amounts of acidic substances dissolved or mechanically dispersed therein. Such tetraethyl lead is suitable for some purposes. However, it is usually desirable to remove such haze and acidic substances from the tetraethyl lead. It has been found that such hazy and acid-containing tetraethyl lead can be clarified and its stability significantly increased by washing with water, or preferably, with an aqueous alkaline solution. The washing with alkaline solution may be done in one or several steps; for example, first with strong, e.g. 50% caustic (NaOH) to neutralize the acid, and then with dilute, e.g. 10% caustic (NaOH) to produce the finish product. Any of the other alkali metal hydroxides; alkali metal carbonates or bicarbonates; aqueous ammonia; or aqueous solutions of water-soluble amines, e.g. ethanolamine, may also be used.

In order to more clearly illustrate this invention, preferred modes of carrying it into effect and the advantageous results to be obtained thereby the following examples are given in which the tetraethyl lead had been steam-distilled and aerated so that it was substantially free of organic bismuth compounds, and in which the quantities and proportions are by weight except where specifically indicated otherwise.

*Example 1*

Impure tetraethyl lead, analyzing 0.41% hexaethyl dilead, was mixed and stirred with 2 volume percent of an aqueous solution of 44% by weight formic acid at 28° C. under an atmosphere of air, the mixture settled, and the aqueous layer removed. The tetraethyl lead layer was treated with excess dilute aqueous sodium hydroxide to neutralize the acid, and the purified tetraethyl lead was separated from the aqueous layer. The times of mixing with the aqueous acid solution are tabulated below along with the results on the hexaethyl dilead (Hexa) content of the tetraethyl lead.

| Temp., ° C. | Time, Min. | Final Hexa, percent |
|---|---|---|
| 28 | 10 | 0.10 |
| 28 | 50 | 0.04 |

*Example 2*

This example shows the use of more dilute aqueous formic acid in the process of the invention. The procedure involved agitating 100 volumes of the impure tetraethyl lead under an atmosphere of air with from 7 to 16 volumes of 1.25% to 8.8% aqueous formic acid, as tabulated below, using a crescent-shaped anchor agitator at between 400 and 500 r.p.m. and maintaining the reaction mixture at 45° C. for 30 to 90 minutes. The mixture was then allowed to settle, the aqueous acid layer withdrawn, and the tetraethyl lead layer washed with dilute aqueous caustic and analyzed. The results were:

| Formic Acid | | Time, Min. | Start | Finish |
|---|---|---|---|---|
| Conc. | Vol. percent | | | |
| 1.25 | 16 | 60 | 0.3 | 0.07 |
| 2.5 | 14 | 90 | 0.3 | nil |
| 5.0 | 7 | 90 | 0.3 | nil |
| 8.8 | 10 | 30 | 0.84 | 0.14 |
| 8.8 | 10 | 60 | 0.84 | nil |

*Example 3*

This example illustrates the effect of oxygen. The procedure was essentially that of Example 1, except that in one run the reaction mass is maintained under a blanket of nitrogen, and in the other under air. The following results were obtained using 1.25% aqueous formic acid in the amount of 16 vol. percent based on the tetraethyl lead:

| Atmosphere Over Reaction Mass | Hexa, percent | |
|---|---|---|
| | Start | After 60 Min. |
| Nitrogen | 0.30 | 0.16 |
| Air | 0.30 | 0.07 |

*Example 4*

6500 parts of tetraethyl lead, analyzing 0.2% hexaethyl dilead, was intimately mixed by agitation as in Example 3 with 390 parts of 5% aqueous formic acid while air was being sparged through the mixture at a rate of 30 standard cubic feet per hour per square foot of cross-sectional area of the treating vessel. The temperature of the reaction mass was 40° C. and the reaction time was 30 to 60 minutes (or until the hexaethyl dilead content was reduced to about 0.05% or less). The batch was then settled and the aqueous acid layer withdrawn. Residual acidity in the tetraethyl lead layer was neutralized with 50% aqueous NaOH solution, which was then separated off. The product was then washed with 10% aqueous NaOH (6 volumes per 100 volumes of tetraethyl lead) to give a clear water-white tetraethyl lead analyzing 0.05% or less hexaethyl dilead.

Similar results were obtained using air at sparging rates of 18 to 42 s.c.f./hr./ft.$^2$.

*Example 5*

Employing the procedure of Example 1, impure tetraethyl lead, analyzing 0.47% hexaethyl dilead, was treated with 10 volumes of the aqueous solutions of acid listed below per 100 volumes of impure tetraethyl lead (TEL) with the results shown below:

| Concentration of Acid Solution | Acid to TEL, Weight Ratio | Percent Hexa | |
|---|---|---|---|
| | | Initial | Final |
| 5% acetic | 0.31 | 0.47 | 0.28 |
| 10% acetic | 0.62 | 0.47 | 0.07 |
| 1.75% formic | 0.11 | 0.47 | 0.14 |
| 2.5% formic | 0.16 | 0.47 | 0.08 |

*Example 6*

100 volumes of tetraethyl lead, analyzing 0.47% hexaethyl dilead (hexa), was mixed with 10 volumes of aqueous acetic acid as identified below, and the mixture vigorously agitated with a crescent-shaped anchor stirrer at 400 to 500 r.p.m., with the temperature maintained at about 45° C. for 60 minutes. In one run, as indicated below, an atmosphere of air was maintained over the reaction mass, in two others an atmosphere of nitrogen, while in the fourth excess air was bubbled through the reaction mixture.

After the mixture was settled, the acid layer was withdrawn, the tetraethyl lead layer washed with dilute aqueous caustic and analyzed. The results were:

| Acetic Acid Conc., percent | Reaction Mass Atmos. | Hexa Content (Start 0.47%) After Treatment, percent |
|---|---|---|
| 49 | Air | nil |
| 49 | Nitrogen | 0.38 |
| 0.25 | Nitrogen | 0.38 |
| 0.25 | Air (bubbled) | 0.28 |

*Example 7*

100 parts steam-distilled, aerated and water washed tetraethyl lead, analyzing 0.36% hexaethyl dilead, was mixed with 4 parts of 10% acetic acid and, while the mixture was agitated as in Example 6 at 400–500 r.p.m., air was sparged through at a rate corresponding to 30 standard cubic feet per hour per square foot of cross-sectional area of the treating vessel. The temperature of the reaction mass was held at about 40° C. and the above treatment maintained for 30 to 60 minutes until the hexaethyl dilead content was lowered to 0.05% or less. The batch was settled, and the acid solution recovered for reuse by decantation. Sufficient 50% aqueous caustic (NaOH) was added to neutralize the acidity remaining in the treating vessel, the mixture again settled, and the aqueous layer withdrawn. The tetraethyl lead was then washed with 6 volumes of 10% aqueous NaHO per 100 volumes of the tetraethyl lead layer and, upon settling, the tetraethyl lead layer was obtained clear and water-white and analyzed 0.5% or less hexaethyl dilead.

In the above examples, the losses of the tetraethyl lead component under the conditions employed amounted to about 0.5% or less. Also, the recovered acid wash layer can be reused. Since acid is also consumed in this process of eliminating hexaethyl dilead, the spent acid layer can be refortified by the addition thereto of more concentrated acid solution.

It will be understood that the preceding Examples have been given for illustrative purposes solely and that this invention is not limited to the specific embodiments described therein. On the other hand, it will be readily apparent to those skilled in the art that, subject to the limitations set forth in the general description, the proportions, concentrations, conditions, and techniques employed can be widely varied without departing from the spirit or scope of this invention.

From the preceding description, it will be apparent that this invention constitutes a valuable process for decreasing the hexaethyl dilead content of tetraethyl lead containing it to an unobjectionable low concentration without destroying objectionably large amounts of the tetraethyl lead. Also, such process is simple, easy, and economical to operate. Thus it is apparent that this invention constitutes a valuable advance in and contribution to the art.

The embodiments of the invention in which an exclusive property or privilege is claimed are defined as follows.

We claim:

1. The process for decreasing the hexaethyl dilead con-

1. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from 0° C. to about 70° C. in the presence of an oxygen-containing gas with an aqueous solution of from about 1% to about 50% by weight of an acid of the group consisting of formic acid and acetic acid, employing an amount of said aqueous solution to provide a separate aqueous phase and from 0.1 to about 100 parts by weight of acid for each part of hexaethyl dilead, maintaining said contact until the hexaethyl dilead content is lowered to the desired level, then settling the reaction mixture to form an aqueous layer and a layer of purified tetraethyl lead, and separating said layers.

2. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from 0° C. to about 70° C. in the presence of air with from about 0.2 to about 100 volume percent based on the tetraethyl lead of an aqueous solution of from about 1% to about 50% by weight of an acid of the group consisting of formic acid and acetic acid, the amount and concentration of said acid solution being that which provides from 0.1 to about 100 parts by weight of acid for each part of hexaethyl dilead, maintaining said contact until the hexaethyl dilead content is lowered to the desired level, then settling the reaction mixture to form an aqueous layer and a layer of purified tetraethyl lead, and separating said layers.

3. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from about 20° C. to about 50° C. with from about 2 to about 16 volume percent based on the tetraethyl lead of an aqueous solution of from about 1% to about 15% by weight of an acid of the group consisting of formic acid and acetic acid, the amount and concentration of said acid solution being that which provides from about 0.5 to about 5 parts by weight of acid for each part of hexaethyl dilead, while passing air through the reaction mixture, maintaining said contact until the hexaethyl dilead content is lowered to the desired level, then settling the reaction mixture to form an aqueous layer and a layer of purified tetraethyl lead, and separating said layers.

4. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from 0° C. to about 70° C. in the presence of an oxygen-containing gas with an aqueous solution of from about 1% to about 50% by weight of an acid of the group consisting of formic acid and acetic acid, employing an amount of said aqueous solution to provide a separate aqueous phase and from 0.1 to about 100 parts by weight of acid for each part of hexaethyl dilead, maintaining said contact until the hexaethyl dilead content is lowered to the desired level, then settling the reaction mixture to form an aqueous layer and a layer of purified tetraethyl lead, separating said layers, and washing the tetraethyl lead layer with a member of the group consisting of water and an aqueous alkaline solution in an amount sufficient to neutralize any acid remaining in said layer.

5. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from about 20° C. to about 50° C. with from about 2 to about 16 volume percent based on the tetraethyl lead of an aqueous solution of from about 1% to about 15% by weight of an acid of the group consisting of formic acid and acetic acid, the amount and concentration of said acid solution being that which provides from about 0.5 to about 5 parts by weight of acid for each part of hexaethyl dilead, while passing air through the reaction mixture, maintaining said contact until the hexaethyl dilead content is lowered to the desired level, then settling the reaction mixture to form an aqueous layer and a layer of purified tetraethyl lead, separating said layers, and washing the tetraethyl lead layer with a dilute aqueous alkali solution in an amount sufficient to neutralize any acid remaining in said layer.

6. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from 0° C. to about 70° C. in the presence of an oxygen-containing gas with an aqueous solution of from about 1% to about 50% by weight of formic acid, employing an amount of said aqueous solution to provide a separate aqueous phase and from 0.1 to about 100 parts by weight of formic acid for each part of hexaethyl dilead, maintaining said contact until the hexaethyl dilead content is lowered to the desired level, then settling the reaction mixture to form an aqueous layer and a layer of purified tetraethyl lead, and separating said layers.

7. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from 0° C. to about 70° C. in the presence of air with from about 0.2 to about 100 volume percent based on the tetraethyl lead of an aqueous solution of from about 1% to about 50% by weight of formic acid, the amount and concentration of said acid solution being that which provides from 0.1 to about 100 parts by weight of formic acid for each part of hexaethyl dilead, maintaining said contact until the hexaethyl dilead content is lowered to the desired level, then settling the reaction mixture to form an aqueous layer and a layer of purified tetraethyl lead, and separating said layers.

8. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from about 20° C. to about 50° C. with from about 2 to about 16 volume percent based on the tetraethyl lead of an aqueous solution of from about 1% to about 10% by weight of formic acid, the amount and concentration of said acid solution being that which provides from about 0.5 to about 2 parts by weight of formic acid for each part of hexaethyl dilead, while passing air through the reaction mixture, maintaining said contact until the hexaethyl dilead content is lowered to the desired level, then settling the reaction mixture to form an aqueous layer and a layer of purified tetraethyl lead, and separating said layers.

9. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from 0° C. to about 70° C. in the presence of an oxygen-containing gas with an aqueous solution of from about 1% to about 50% by weight of formic acid, employing an amount of said aqueous solution to provide a separate aqueous phase and from 0.1 to about 100 parts by weight of formic acid for each part of hexaethyl dilead, maintaining said contact until the hexaethyl dilead content is lowered to the desired level, then settling the reaction mixture to form an aqueous layer and a layer of purified tetraethyl lead, separating said layers, and washing the tetraethyl lead layer with a member of the group consisting of water and an aqueous alkaline solution in an amount sufficient to neutralize any acid remaining in said layer.

10. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from about 20° C. to about 50° C. with from about 2 to about 16 volume percent based on the tetraethyl lead of an aqueous solution of from about 1% to about 10% by weight of formic acid, the amount and concentration of said acid solution being that which provides from about 0.5 to about 2 parts by weight of formic acid for each part of hexaethyl dilead, while passing air through the reaction mixture, maintaining said contact until the hexaethyl dilead content is lowered to the desired level, then settling the reaction mixture to form an aqueous layer and a layer of purified tetraethyl lead, separating said layers, and washing the tetraethyl lead layer with a dilute aqueous alkali solution in an amount sufficient to neutralize any acid remaining in said layer.

11. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from 0° C. to about 70° C. in the presence of an oxygen-containing gas with an aqueous solution of from about 1% to about 50% by weight of acetic acid, employing an amount of said aqueous solution to provide a separate aqueous phase and from 0.1 to about 100 parts by weight of acetic acid for each part of hexaethyl dilead, maintaining said contact until the hexaethyl dilead content is lowered to the desired level, then settling the reaction mixture to form an aqueous layer and a layer of purified tetraethyl lead, and separating said layers.

12. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from 0° C. to about 70° C. in the presence of air with from about 0.2 to about 100 volume percent based on the tetraethyl lead of an aqueous solution of from about 1% to about 50% by weight of acetic acid, the amount and concentration of said acid solution being that which provides from 0.1 to about 100 parts by weight of acetic acid for each part of hexaethyl dilead, maintaining said contact until the hexaethyl dilead content is lowered to the desired level, then settling the reaction mixture to form an aqueous layer and a layer of purified tetraethyl lead, and separating said layers.

13. The process for decreasing the hexaethyl dilead content of tetraethyl lead which contains from about 0.2% to about 15% by weight of hexaethyl dilead and which is substantially free of sludge-forming organic bismuth compounds, which process comprises intimately contacting said tetraethyl lead at a temperature of from about 20° C. to about 50° C. with from about 2 to about 16 volume percent based on the tetraethyl lead of an aqueous solution of from about 5% to about 15% by weight of acetic acid, the amount and concentration of said acid solution being that which provides from about 1 to about 5 parts by weight of acetic acid for each part of hexaethyl dilead, while passing air through the reaction mixture, maintaining said contact until the hexaethyl dilead content is lowered to the desired level, then settling the reaction mixture to form an aqueous layer and a layer of purified tetraethyl lead, and separating said layers.

14. The process for decreasing the hexaethyl dilead content of tetraethyl lead which conttains from about 0.2% to about 15% by weight of hexaethyl dilead and which is substantially free of sludge-forming organic bismuth compounds, which process comprises intimately contacting said tetraethyl lead at a temperature of from about 20° C. to about 50° C. with from about 2 to about 16 volume percent based on the tetraethyl lead of an aqueous solution of from about 5% to about 15% by weight of acetic acid, the amount and concentration of said acid solution being that which provides from about 1 to about 5 parts by weight of acetic acid for each part of hexaethyl dilead, while passing air through the reaction mixture, maintaining said contact until the hexaethyl dilead content is lowered to the desired level, then settling the reaction mixture to form an aqueous layer and a layer of purified tetraethyl lead, separating said layers, and washing the tetraethyl lead layer with a dilute aqueous alkali solution in an amount sufficient to neutralize any acid remaining in said layer.

References Cited in the file of this patent

UNITED STATES PATENTS

| | | |
|---|---|---|
| 2,410,356 | Parmelee | Oct. 29, 1946 |
| 2,426,789 | Parmelee | Sept. 2, 1947 |
| 2,763,673 | Gittins et al. | Sept. 18, 1956 |